(12) United States Patent
Freitag et al.

(10) Patent No.: US 7,177,120 B2
(45) Date of Patent: Feb. 13, 2007

(54) SELF-PINNED SPIN VALVE SENSOR WITH A HIGH COERCIVITY ANTIPARALLEL (AP) PINNED LAYER

(75) Inventors: James Mac Freitag, San Jose, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 505 days.

(21) Appl. No.: 10/727,882

(22) Filed: Dec. 3, 2003

(65) Prior Publication Data

US 2005/0122635 A1 Jun. 9, 2005

(51) Int. Cl.
G11B 5/39 (2006.01)
(52) U.S. Cl. .................................. 360/324.11
(58) Field of Classification Search ........... 360/324.11
See application file for complete search history.

(56) References Cited

U.S. PATENT DOCUMENTS 6,118,624 A 9/2000 Fukuzawa et al. .......... 360/113

6,327,123 B1 * 12/2001 Kawato et al. ........ 360/324.11
2004/0008450 A1 * 1/2004 Gill ...................... 360/324.11

* cited by examiner

Primary Examiner—Craig A. Renner
(74) Attorney, Agent, or Firm—Ervin F. Johnston; Matthew S. Zises

(57) ABSTRACT

A magnetic head assembly has a read head that includes a sensor wherein the sensor includes a self-pinned antiparallel (AP) pinned layer structure, a ferromagnetic free layer structure that has a magnetic moment that is free to rotate in response to signal fields and a spacer layer which is located between the free layer and AP pinned layer structures. The self-pinned AP pinned layer structure includes first and second antiparallel (AP) pinned layers, an antiparallel coupling (APC) layer located between and interfacing the first and second AP pinned layers wherein the second AP pinned layer is located between the first AP pinned layer and the spacer layer. The first AP pinned layer is composed of cobalt platinum chromium (CoPtCr).

23 Claims, 6 Drawing Sheets

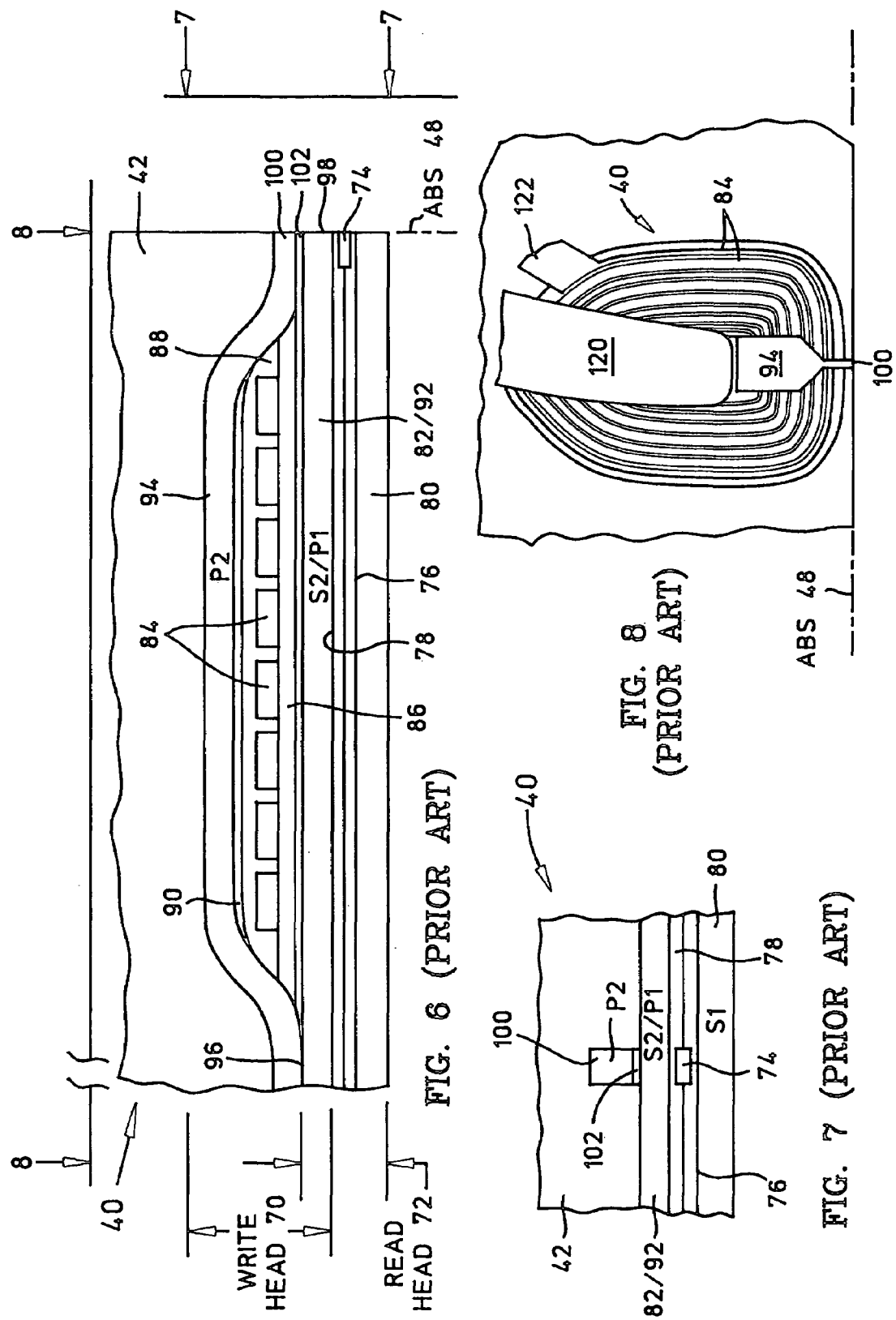

(ABS)

SELF-PINNED SPIN VALVE SENSOR WITH A HIGH COERCIVITY ANTIPARALLEL (AP) PINNED LAYER

BACKGROUND OF THE INVENTION

1. Field of the Invention

The present invention relates to a self-pinned spin valve sensor with a high coercivity antiparallel (AP) pinned layer and, more particularly, to a first AP pinned layer which is farther from a spacer layer than a second AP pinned layer and is composed of a material which has high coercivity to prevent flipping of the magnetizations of the AP pinned layers and high resistivity to prevent sense current shunting.

2. Description of the Related Art

The heart of a computer is a magnetic disk drive which includes a magnetic disk, a slider that has read and write heads, a suspension arm and an actuator arm that swings the suspension arm to place the read and write heads adjacent selected circular tracks on the disk when the disk is rotating. The suspension arm biases the slider into contact with the surface of the disk or parks it on a ramp when the disk is not rotating but, when the disk rotates and the slider is positioned over the rotating disk, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic field signals to and reading magnetic field signals from the rotating disk. The read and write heads are connected to processing circuitry that operates according to a computer program to implement the writing and reading functions.

An exemplary high performance read head employs a spin valve sensor for sensing magnetic signal fields from the rotating magnetic disk, which sensor is also known as a giant magnetoresistance (GMR) sensor. The spin valve sensor comprises a nonmagnetic electrically conductive spacer layer that is sandwiched between a ferromagnetic pinned layer and a ferromagnetic free or sense layer. An antiferromagnetic pinning layer typically interfaces the pinned layer for pinning the magnetization of the pinned layer 90° with respect to an air bearing surface (ABS) of the sensor wherein the ABS of the sensor is an exposed surface of the sensor that faces the rotating disk. First and second hard bias and lead layers are typically connected to the sensor for conducting a sense current therethrough. The magnetization of the free layer is free to rotate upwardly and downwardly with respect to the ABS from a quiescent or zero bias point position in response to positive and negative signal fields respectively from the rotating magnetic disk. The quiescent position of the magnetization of the free layer, which is parallel to the ABS, is when the sense current is conducted through the sensor without signal fields from the rotating magnetic disk.

The spin valve sensor is located between nonmagnetic first and second electrically nonconductive first and second read gap layers and the first and second read gap layers are located between ferromagnetic first and second shield layers. The distance between the first and second shield layers defines the linear bit density of the read head and the track width (TW) of the spin valve sensor at the free layer defines the track width density of the read head. These combined densities, which is known as areal density, governs the storage capacity of the magnetic disk drive. First and second hard bias and lead layers are typically connected to first and second side surfaces of the sensor, which connection is known in the art as a contiguous junction. This junction, which conducts the sense current ($I_S$) through the sensor, is described in commonly assigned U.S. Pat. No. 5,018,037. The first and second hard bias layers longitudinally stabilize the magnetization of the free layer of the sensor in a single domain state which is important for proper operation of the sensor.

When the magnetic moments of the pinned and free layers are parallel with respect to one another the resistance of the sensor to the sense current ($I_S$) is at a minimum and when their magnetic moments are antiparallel the resistance of the sensor to the sense current ($I_S$) is at a maximum. Changes in resistance of the sensor is a function of $\cos\theta$, where $\theta$ is the angle between the magnetic moments of the pinned and free layers. When the sense current ($I_S$) is conducted through the sensor, resistance changes, due to signal fields from the rotating magnetic disk, cause potential changes that are detected and processed as playback signals. The sensitivity of the sensor is quantified by a giant magnetoresistance (GMR) coefficient $\Delta R/R$ where $\Delta R$ is the change in resistance of the read sensor from minimum resistance (when magnetizations of free and pinned layers are parallel to each other) to maximum resistance (when magnetizations of the free and pinned layers are antiparallel to each other) and R is the resistance of the read sensor at minimum resistance.

Spin valve sensors are classified as a bottom spin valve sensor or a top spin valve sensor depending upon whether the pinned layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or first and second (AP1) and (AP2) ferromagnetic AP layers that are separated by a coupling layer with magnetic moments of the ferromagnetic AP layers being antiparallel. The advantage of the AP pinned layer structure is that the magnetizations of the first and second AP pinned layers (AP1) and (AP2) substantially counterbalance one another so that the net magnetization of the AP pinned layer structure minimally affects the quiescent parallel position of the free layer. Spin valve sensors are still further classified as single or dual wherein a single spin valve sensor employs only one pinned layer and a dual spin valve sensor employs two pinned layers with the free layer structure located therebetween.

A scheme for minimizing the aforementioned gap length between the first and second shield layers is to provide a self-pinned AP pinned layer structure. The self-pinned AP pinned layer structure eliminates the need for the aforementioned pinning layer which permits the read gap to be reduced. In the self-pinned AP pinned layer structure each of the first and second AP pinned layers has a uniaxial anisotropy field due to crystalline structure and other factors concerning the material and a magnetostriction uniaxial anisotropy field where the magnetostriction uniaxial anisotropy field is equal to $$\frac{3\lambda\sigma}{\text{magnetization of the layer}}$$

where $\lambda$ is magnetostriction and $\sigma$ is stress of the layer. A positive magnetostriction of the layer and compressive stress therein results in a magnetostriction uniaxial anisotropy field that can support the uniaxial anisotropy field. Compressive stress in the AP pinned layers occurs when the magnetic head is lapped to the ABS. The orientations of the magnetic moments of the AP pinned layers are set by an external field.

In the AP pinned layer structure the second AP pinned layer (AP2) is located between the first AP pinned layer (AP1) and the spacer layer. The first AP pinned layer (AP1), which is farther away from the spacer layer than the second AP pinned layer (AP2), can be referred to as a keeper layer since it keeps the magnetization of the second AP pinned layer (AP2) aligned perpendicular to the ABS and the second AP pinned layer (AP2) can be referred to as a reference layer since it is the relative orientation of the magnetizations of the free layer and the second AP pinned layer (AP2) that determine the resistance of the spin valve sensor. While the AP pinned layer structure reduces the net magnetic moment on the free layer structure and the self-pinned AP pinned layer structure reduces the read gap, the keeper layer shunts a portion of the sense current which is not the case when the single pinned layer is employed for the pinned layer structure. Accordingly, there is a strong-felt need to reduce the sense current shunting through the keeper layer. Another problem is that if the self-pinning of the AP pinned layer structure is not sufficient, unwanted extraneous fields can disturb the orientations of the magnetic moments of the AP pinned layers or, in a worst situation, can reverse their directions. This is known in the art as amplitude flipping.

SUMMARY OF THE INVENTION

The present read head has a sensor which includes a self-pinned antiparallel (AP) pinned layer structure, a ferromagnetic free layer structure, which has a magnetic moment that is free to rotate in response to a signal field, and a spacer layer which is located between the free layer and the AP pinned layer structure. The self-pinned AP pinned layer structure includes first and second antiparallel (AP) pinned layers and an antiparallel coupling (APC) layer located between and interfacing the first and second AP pinned layers. The second AP pinned layer is located between the first AP pinned layer and the spacer layer and the first AP pinned layer, which is farther from the spacer layer than the first AP pinned layer, is composed of cobalt platinum chromium (CoPtCr). The cobalt platinum chromium (CoPtCr) minimizes sense current shunting and amplitude flipping.

BRIEF DESCRIPTION OF THE DRAWINGS

FIG. 6 is a partial view of the slider and a prior art merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
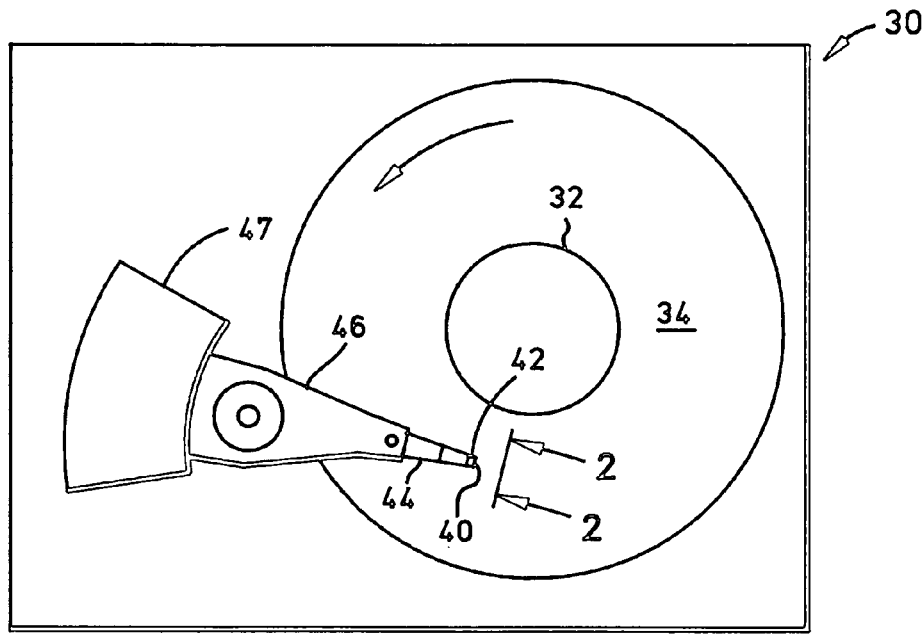
FIG. 1 is a plan view of an exemplary prior art magnetic disk drive.
Figure 2:
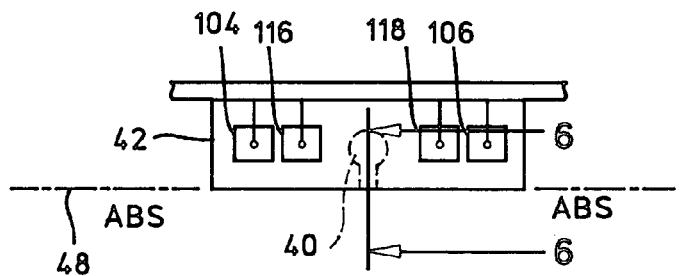
FIG. 2 is an end view of a slider with a magnetic head of the disk drive as seen in plane 2—2 of FIG. 1.
Figure 3:
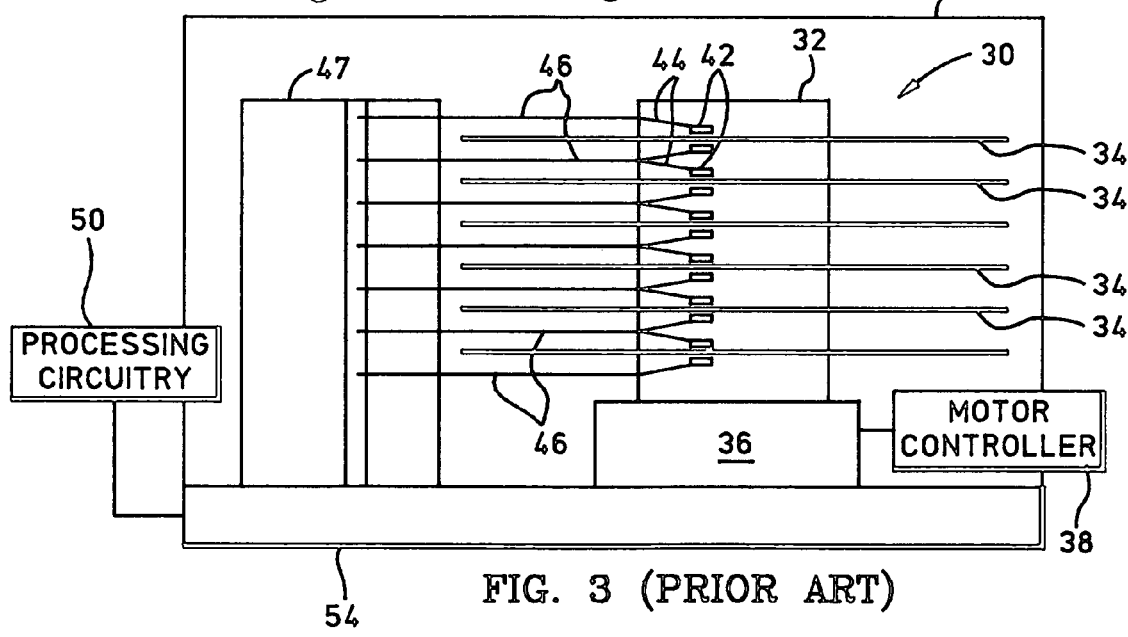
FIG. 3 is an elevation view of the magnetic disk drive wherein multiple disks and magnetic heads are employed.
Figure 4:
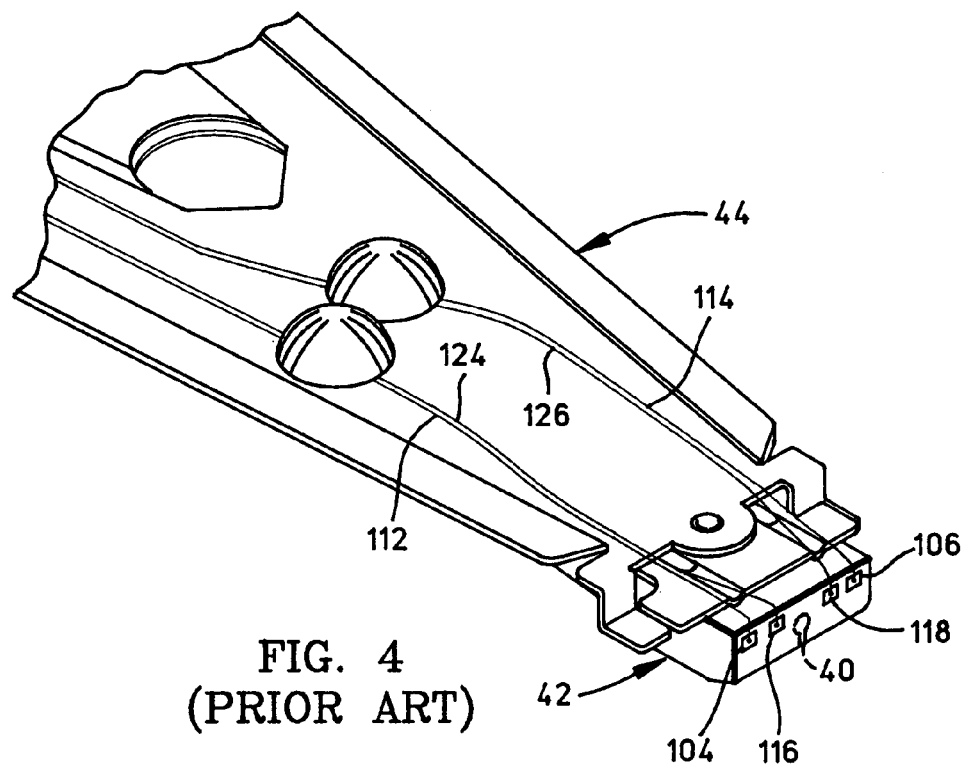
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
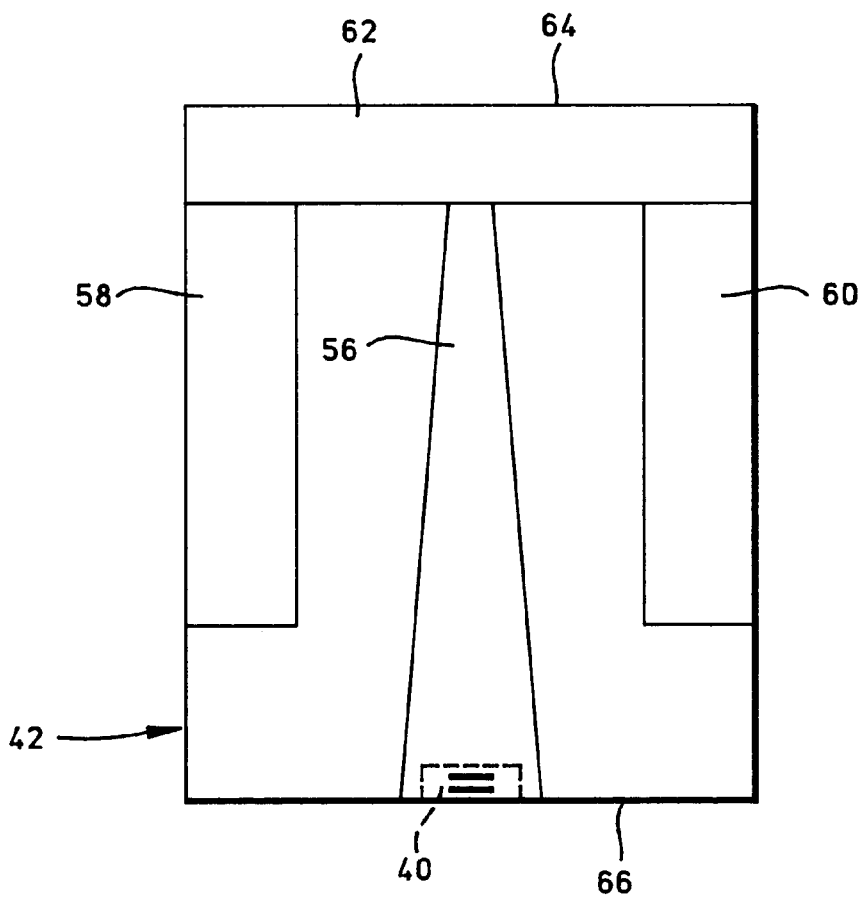
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically nonconductive first and second read gap layers 76 and 78 which are, in turn, sandwiched between ferromagnetic first and second shield layers (S1) and (S2) 80 and 82. In response to external magnetic fields, the resistance of the spin valve sensor 74 changes. When the sense current $I_S$ is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers (P1) and (P2) 92 and 94. The first and second pole piece layers 92 and 94 are magnetically coupled at a back gap 96 and have first and second pole tips 98 and 100 which are separated by a write gap layer 102 at the ABS. Since the second shield layer (S2) 82 and the first pole piece layer (P1) 92 are a common layer (S2/P1) this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
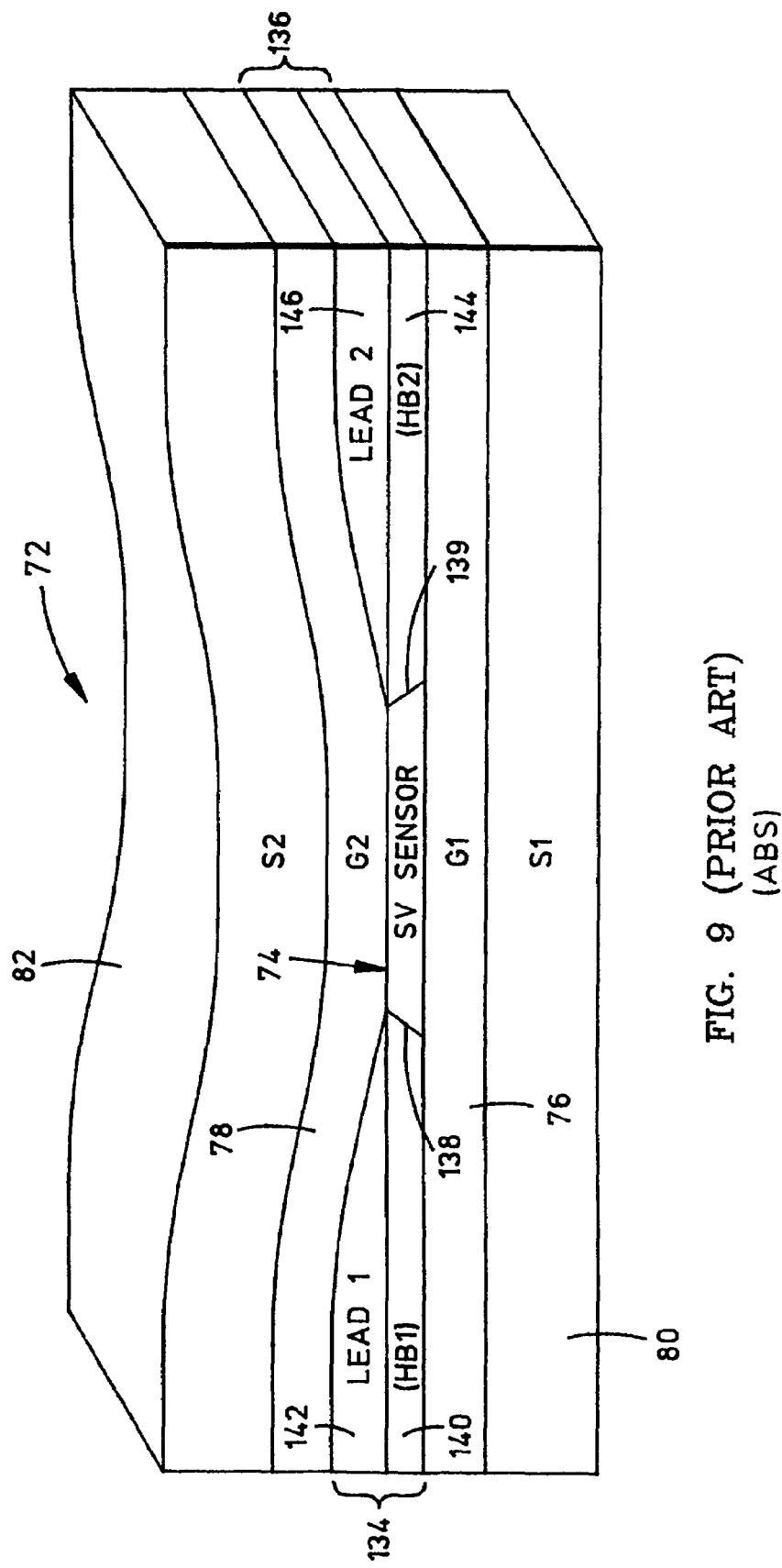
FIG. 9 is an enlarged isometric ABS illustration of a prior art read head with a spin valve sensor.

FIG. 9 is an enlarged ABS illustration of the read head 72 shown in FIG. 6 wherein the read head 72 includes the spin valve (SV) sensor 74. First and second hard bias and lead layers 134 and 136 are typically connected to first and second side surfaces 138 and 139 of the sensor 74. This connection, which conducts the sense current ($I_S$) through the sensor, is known in the art as a contiguous junction as referred to hereinabove. The first hard bias and lead layers 134 include a first hard bias (HB1) layer 140 and a first lead layer (Lead 1) 142. The second hard bias and lead layers 136 include a second hard bias layer (HB2) 144 and a second lead layer (Lead 2) 146. The hard bias layers 140 and 144 produce a longitudinal bias field to stabilize the free layer of the sensor 74 in a single magnetic domain state. The sensor 74 and the first and second hard bias and lead layers 134 and 136 are located between the nonmagnetic electrically insulating first and second read gap layers (G1) and (G2) 76 and 78. The first and second read gap layers 76 and 78 are, in turn, located between the first and second ferromagnetic shield layers (S1) and (S2) 80 and 82.

THE INVENTION

Figure 10:
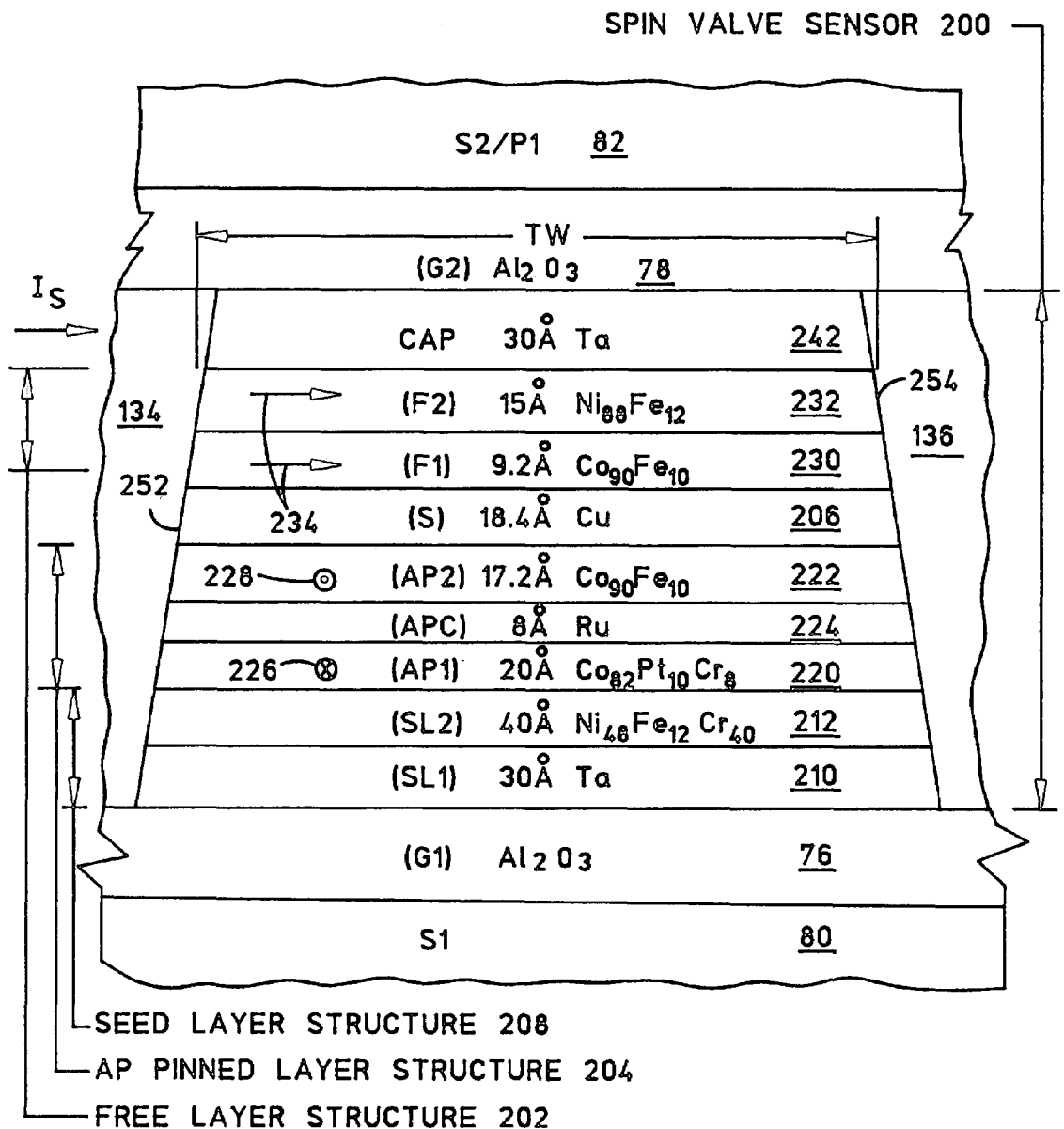
FIG. 10 is an ABS view of an embodiment of the present spin valve sensor.

The present spin valve sensor 200 is illustrated in FIG. 10 wherein the spin valve sensor is located between the first and second read gap layers (G1) and (G2) 76 and 78 and the first and second read gap layers are located between the first and second shield layers (S1) and (S2) 80 and 82. The spin valve sensor 200 includes a free layer structure 202 and a self-pinned antiparallel (AP) pinned layer structure 204. A nonmagnetic electrically conductive spacer layer (S) 206 is located between the free layer structure 202 and the AP pinned layer structure 204. Because the free layer structure 202 is located between the AP pinned layer structure 204 and the second shield layer 82 the spin valve sensor 200 is a bottom spin valve sensor. A seed layer structure 208 may be located between the first shield layer 80 and the AP pinned layer structure 204. The seed layer structure 208 may include first and second seed layers (SL1) and (SL2) 210 and 212. The seed layers, with the thicknesses and materials shown, have been found to promote a desirable texture of the layers deposited thereon.

It should be noted that the spin valve sensor 200 does not include the typical antiferromagnetic (AFM) pinning layer for pinning magnetic moments of the AP pinned layer structure 204. An aspect of the invention is to provide an AP pinned layer structure 204 which is self-pinning. The AP pinned layer structure 204 includes ferromagnetic first and second AP pinned layers (AP1) and (AP2) 220 and 222 which may be referred to as a keeper layer and a reference layer respectively. A nonmagnetic electrically conductive antiparallel coupling (APC) layer 224 is located between and interfaces the first and second AP pinned layers 220 and 222. The first AP pinned layer 220 has a magnetic moment 226 which is oriented perpendicular to the ABS in a direction, either out of the sensor or into the sensor, as shown in FIG. 10, and the second AP pinned layer has a magnetic moment 228 which is oriented antiparallel to the magnetic moment 226 by a strong antiparallel coupling between the first and second AP pinned layers 220 and 222.

The first AP pinned layer 220 may have a higher magnetic moment than the second AP pinned layer 222. The direction of the magnetic moment 228, either into or out of the sensor, is determined by the direction in which the magnetic moment 226 is set by an external magnetic field. With the arrangement shown in FIG. 10, the magnetic field has been applied into the sensor which causes the magnetic moment 228 to be directed out of the sensor. If the external field is reversed in its direction, the magnetic moment 228 would be directed into the sensor. In another embodiment the second AP pinned layer 222 may have a greater magnetic moment than the first AP pinned layer 220. When the AP pinned layers 220 and 222 are formed by sputter deposition they are deposited in the presence of a field which is oriented perpendicular to the ABS. In this manner, the easy axes of the first and second AP pinned layers will be likewise oriented perpendicular to the ABS.

The free layer structure 202 may include first and second free layers (F1) and (F2) 230 and 232. It has been found that when the free layer structure 202 has a cobalt iron first free layer 230 between the spacer layer 206 and a nickel iron second free layer 232 that the magnetoresistive coefficient dR/R of the spin valve sensor is increased. The free layer structure has a magnetic moment 234 which is oriented parallel to the ABS and parallel to the major thin film planes of the layers. When a signal field from the rotating magnetic disk rotates the magnetic moment 234 into the sensor the magnetic moments 234 and 228 become more antiparallel which increases the resistance of the sensor to the sense current $I_S$ and when a field signal rotates the magnetic moment 234 out of the sensor the magnetic moments 234 and 228 become more parallel which decreases the resistance of the sensor to the sense current $I_S$. These resistance changes cause potential changes within the processing circuitry 50 in FIG. 3 which are processed as playback signals. A cap layer 242 is located on the free layer structure 202 for protecting it from subsequent processing steps. The above layers form the spin valve sensor 200 with first and second side surfaces 252 and 254.

In the invention the first AP pinned layer 220 is cobalt platinum chromium. This material has a high sheet resistance for reducing sense current shunting therethrough and has a high coercivity to minimize amplitude flipping of the first and second AP pinned layers 220 and 222. The second AP pinned layer 222 is composed of cobalt iron (CoFe) which interfaces a copper (Cu) spacer layer 206 and promotes an increase in the magnetoresistive coefficient. An aspect of the invention is that the cobalt platinum chromium is $Co_{82}Pt_{10}Cr_8$ in atomic percent. The sheet resistance and the coercivity of the first AP pinned layer 220 will be discussed in more detail hereinafter.

Exemplary thicknesses and materials in atomic percentages of the layers in FIG. 10 are 30 Å of Ta for the layer 210, 40 Å of $Ni_{48}Fe_{12}Cr_{40}$ for the layer 212, 20 Å of $Co_{82}Pt_{10}Cr_8$ for the layer 220, 8 Å of Ru for the layer 224, 17.2 Å of $Co_{90}Fe_{10}$ for the layer 222, 18.4 Å of Cu for the layer 206, 9.2 Å of $Co_{90}Fe_{10}$ for the layer 230, 15 Å of $Ni_{88}Fe_{12}$ for the layer 232 and 30 Å of Ta for the cap layer 242.

EXAMPLE 1

In this example the structure shown in FIG. 10 was tested except the first AP pinned layer 220 was 25.9 Å of cobalt iron ($Co_{90}Fe_{10}$) instead of 20 Å of cobalt platinum chromium ($Co_{82}Pt_{10}Cr_8$). The test showed that the sheet resistance $R_S$ was 25.2 ohms/sq., the magnetoresistive coefficient ΔR/R was 15.84%, the magnetostriction λ was $-1.5\times10^{-6}$ and the coercivity was 10 Oe wherein coercivity was measured in a test structure described hereinbelow. This is shown in the chart hereinbelow.

EXAMPLE 2

The read head shown in FIG. 10 was tested again except the first AP pinned layer was 27.7 Å of cobalt platinum chromium ($Co_{82}Pt_{10}Cr_8$) instead of 20 Å of cobalt platinum chromium ($Co_{82}Pt_{10}Cr_8$). The sheet resistance $R_S$ was 26.7 ohms/sq., the magnetoresistive coefficient ΔR/R was 16.94%, the magnetostriction λ was $-2.1\times10^{-6}$ and the coercivity was 60 Oe wherein coercivity was measured in a test structure described hereinbelow. The results are shown in the chart hereinbelow.

Chart

| AP1 | $R_S$ (Ω/sq) | ΔR/R (%) | t (Å) | λ ($\times 10^{-6}$) | AP1 coercivity (Oe) |
|---|---|---|---|---|---|
| $Co_{90}Fe_{10}$ (standard) | 25.2 | 15.84 | 25.9 | −2.5 | 10 |
| CoPtCr | 26.7 | 16.94 | 27.7 | −2.1 | 60 |

It can be seen from the chart that both the sheet resistance $R_S$ and the GMR coefficient ΔR/R are enhanced by using cobalt platinum chromium ($Co_{82}Pt_{10}Cr_8$) for the first AP pinned layer 220 instead of using cobalt iron ($Co_{90}Fe_{10}$). Further, it can be seen from the chart that the coercivity of the first AP pinned layer 220 is significantly increased when this layer is composed of cobalt platinum chromium ($Co_{82}Pt_{10}Cr_8$).

Figure 11:
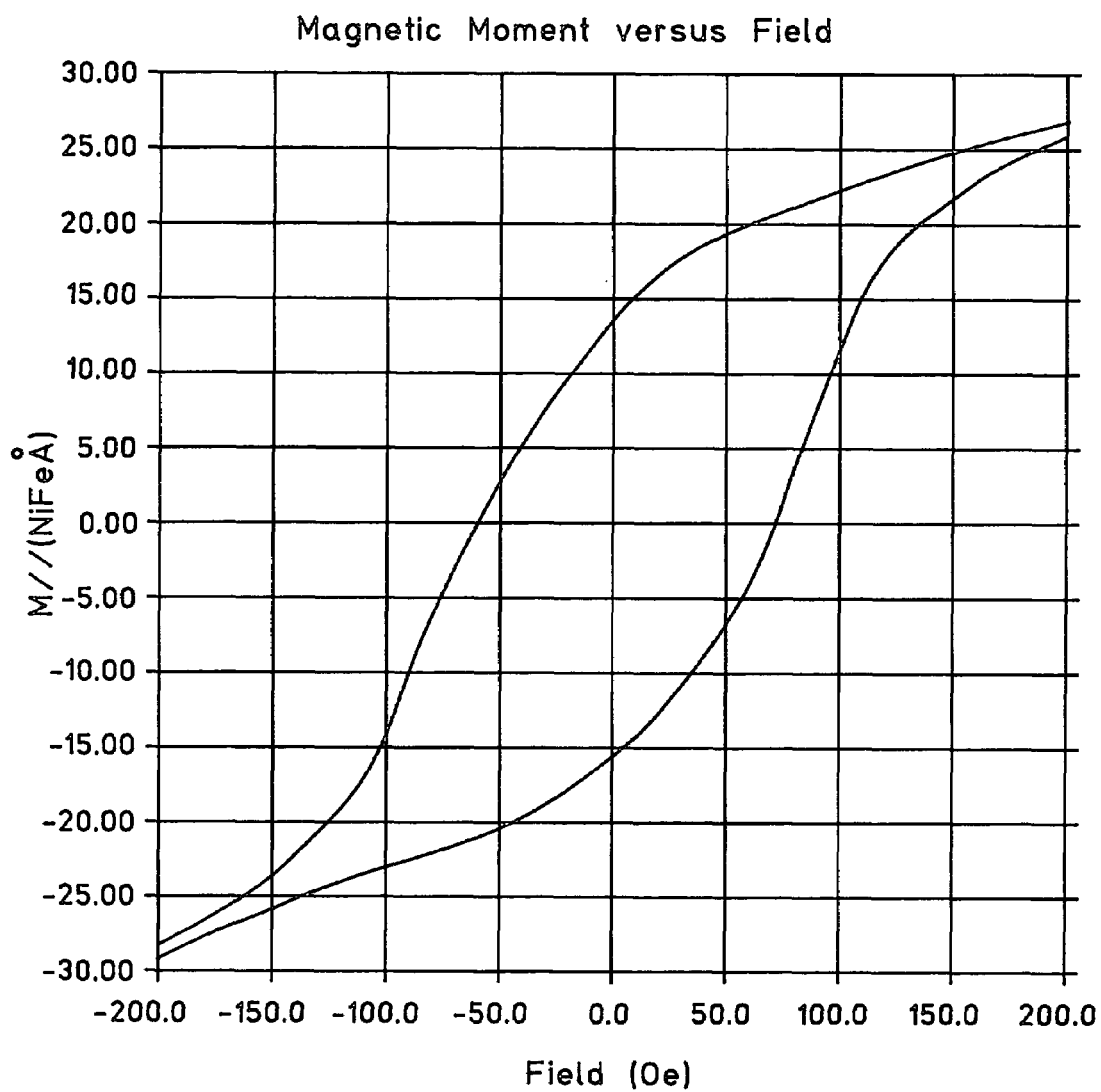
FIG. 11 is a graph showing magnetic moment versus field for a test AP pinned layer.

The graph in FIG. 11 shows magnetic moment versus field for a first AP pinned layer (AP1) test structure consisting of $Al_2O_3$, 30 Å/Ta, 20 Å/NiFeCr, 40 Å/CoPtCr, 20 Å/Ru, 8 Å/Ta 40 Å. As can be seen from FIG. 11 that the coercivity of the test structure when the first AP pinned layer is 20 Å of cobalt platinum chromium ($Co_{82}Pt_{10}Cr_8$) is approximately 60 Å which correlates with the chart hereinabove.

DISCUSSION

It should be understood that the spin valve sensor may be a top spin valve sensor instead of a bottom spin valve sensor, as shown in FIG. 10, that the spin valve sensor may be a dual spin valve sensor instead of a single spin valve sensor, as shown in FIG. 10, and that the sense current may be perpendicular to the major thin film planes of the layers instead of parallel thereto, as shown in FIG. 10, without departing from the spirit of the invention. The spin valve sensor shown in FIG. 10 is a current-in-plane (CIP) sensor whereas when the sense current is perpendicular to the planes, the sensor is referred to as a current perpendicular to the planes (CPP) sensor. In a magnetic tunnel junction (MTJ) type CPP sensor the spacer layer 206 is a nonmagnetic electrically nonconductive material such as aluminum oxide ($Al_2O_3$).

Clearly, other embodiments and modifications of this invention will occur readily to those of ordinary skill in the art in view of these teachings. For instance, the slider supporting the sensor may have a head surface other than the aforementioned ABS, such as a head surface which contacts a tape in a tape drive. Therefore, this invention is to be limited only by the following claims, which include all such embodiments and modifications when viewed in conjunction with the above specification and accompanying drawings.

We claim:

1. A magnetic head assembly, that has a head surface for facing a magnetic medium, comprising:
   a read head that includes a sensor;
   the sensor including:
      an antiparallel (AP) pinned layer structure;
      a ferromagnetic free layer structure having a magnetic moment that is free to
      rotate in response to a field signal; and
      a spacer layer located between the free layer structure and the AP pinned layer structure;
   the antiparallel (AP) pinned layer structure including:
      ferromagnetic first and second antiparallel (AP) pinned layers;
      an antiparallel coupling (APC) layer located between and interfacing the first and second AP pinned layers;
      the first and second AP pinned layers self pinning one another without assistance of an antiferromagnetic (AFM) pinning layer;
      the second AP pinned layer being located between the first AP pinned layer and the spacer layer; and
      the first AP pinned layer being composed of cobalt platinum chromium $Co_{82}Pt_{10}Cr_8$.

2. A magnetic head assembly as claimed in claim 1 including:
   nonmagnetic electrically nonconductive first and second read gap layers;
   the sensor being located between the first and second read gap layers;
   ferromagnetic first and second shield layers; and
   the first and second read gap layers being located between the first and second shield layers.

3. A magnetic head assembly as claimed in claim 2 further comprising: a write head including:
   ferromagnetic first and second pole piece layers that have a yoke portion located between a pole tip portion and a back gap portion;
   a nonmagnetic write gap layer located between the pole tip portions of the first and second pole piece layers;
   an insulation stack with at least one coil layer embedded therein located between the yoke portions of the first and second pole piece layers; and
   the first and second pole piece layers being connected at their back gap portions.

4. A magnetic head assembly as claimed in claim 2 wherein the free layer structure is located between the AP pinned layer structure and a first pole piece layer.

5. A magnetic head assembly as claimed in claim 4 wherein the second AP pinned layer is composed of cobalt iron (CoFe).

6. A magnetic head assembly as claimed in claim 5 further comprising:
   a seed layer structure located between the first read gap layer and the AP pinned layer structure; and the seed layer structure including:
a first seed layer composed of tantalum (Ta) and a second seed layer composed of nickel iron chromium (NiFeCr); and
the first seed layer being located between the first read gap layer and the second seed layer.

7. A magnetic head assembly as claimed in claim 6 wherein the free layer structure includes a first free layer composed of cobalt iron (CoFe) and a second free layer composed of nickel iron (NiFe) with the first free layer being located between the spacer layer and the second free layer.

8. A magnetic head assembly as claimed in claim 7 wherein the spacer layer is copper (Cu).

9. A magnetic head assembly as claimed in claim 1 further comprising:
a seed layer structure located between a first read gap layer and the AP pinned layer structure; and
the seed layer structure including:
a first seed layer composed of tantalum (Ta) and a second seed layer composed of nickel iron chromium (NiFeCr); and
the first seed layer being located between the first read gap layer and the second seed layer.

10. A magnetic disk drive including at least one magnetic head assembly that has a head surface for facing a magnetic medium and that includes a write head and a read head, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; the read head including:
nonmagnetic electrically nonconductive first and second read gap layers;
a sensor located between the first and second read gap layers;
ferromagnetic first and second shield layers; and
the first and second read gap layers being located between the first and second shield layers; the sensor including:
an antiparallel (AP) pinned layer structure;
a ferromagnetic free layer structure having a magnetic moment that is free to rotate in response to a field signal; and
a spacer layer located between the free layer structure and the AP pinned layer structure;
the antiparallel (AP) pinned layer structure including:
ferromagnetic first and second antiparallel (AP) pinned layers;
an antiparallel coupling (APC) layer located between and interfacing the first and second AP pinned layers;
the first and second AP pinned layers self pinning one another without assistance of an antiferromagnetic (AFM) pinning layer;
the second AP pinned layer being located between the first AP pinned layer and the spacer layer; and
the first AP pinned layer being composed of cobalt platinum chromium $Co_{82}Pt_{10}Cr_8$;
a housing;
the magnetic medium being supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

11. A magnetic disk drive as claimed in claim 10 further comprising:
a seed layer structure located between the first read gap layer and the AP pinned layer structure; and
the seed layer structure including:
a first seed layer composed of tantalum (Ta) and a second seed layer composed of nickel iron chromium (NiFeCr); and
the first seed layer being located between the first read gap layer and the second seed layer.

12. A magnetic disk drive as claimed in claim 10 wherein the second AP pinned layer is composed of cobalt iron (CoFe).

13. A magnetic disk drive as claimed in claim 12 further comprising:
a seed layer structure located between the first read gap layer and the AP pinned layer structure; and
the seed layer structure including:
a first seed layer composed of tantalum (Ta) and a second seed layer composed of nickel iron chromium (NiFeCr); and
the first seed layer being located between the first read gap layer and the second seed layer.

14. A magnetic disk drive as claimed in claim 13 wherein the free layer structure includes a first free layer composed of cobalt iron (CoFe) and a second free layer composed of nickel iron (NiFe) with the first free layer being located between the spacer layer and the second free layer.

15. A magnetic disk drive as claimed in claim 14 wherein the spacer layer is copper (Cu).

16. A method of making a magnetic head assembly, which has a head surface for facing a magnetic medium, comprising the steps of:
forming a read head that includes a sensor;
a making of the sensor including the steps of:
forming an antiparallel (AP) pinned layer structure;
forming a ferromagnetic free layer structure that has a magnetic moment that is free to rotate in response to a field signal; and
forming a nonmagnetic electrically conductive spacer layer between the free layer structure and the AP pinned layer structure;
the forming of the antiparallel (AP) pinned layer structure including the steps of:
forming ferromagnetic first and second antiparallel (AP) pinned layers;
forming an antiparallel coupling (APC) layer between and interfacing the first and second AP pinned layers;
the first and second AP pinned layers being further formed to self pin one another without assistance of an antiferromagnetic (AFM) pinning layer;
forming the second AP pinned layer between the first AP pinned layer and the spacer layer; and
forming the first AP pinned layer of cobalt platinum chromium $Co_{82}Pt_{10}Cr_8$.

17. A method of making a magnetic head assembly as claimed in claim 16 further comprising the steps of:

forming nonmagnetic electrically nonconductive first and second read gap layers;

forming the sensor between the first and second read gap layers;

forming ferromagnetic first and second shield layers; and forming the first and second read gap layers between the first and second shield layers.

18. A method of making a magnetic head assembly as claimed in claim 16 wherein the free layer structure is formed between the AP pinned layer structure and a first pole piece layer.

19. A method of making a magnetic head assembly as claimed in claim 16 further comprising the steps of:

forming a seed layer structure between a first read gap layer and the AP pinned layer structure; and a making of the seed layer structure including the steps of:

forming a first seed layer composed of tantalum (Ta) and a second seed layer composed of nickel iron chromium (NiFeCr); and forming the first seed layer between the first read gap layer and the second seed layer.

20. A method of making a magnetic head assembly as claimed in claim 16 wherein the second AP pinned layer is formed of cobalt iron (CoFe).

21. A method of making a magnetic head assembly as claimed in claim 20 further comprising the steps of:

forming a seed layer structure between the first read gap layer and the AP pinned layer structure; and a making of the seed layer structure including the steps of:

forming a first seed layer composed of tantalum (Ta) and a second seed layer composed of nickel iron chromium (NiFeCr); and forming the first seed layer between the first read gap layer and the second seed layer.

22. A method of making a magnetic head assembly as claimed in claim 21 wherein the free layer structure includes a first free layer formed of cobalt iron (CoFe) and a second free layer formed of nickel iron (NiFe) with the first free layer being located between the spacer layer and the second free layer.

23. A method of making a magnetic head assembly as claimed in claim 22 wherein the spacer layer is formed of copper (Cu).

* * * * *